United States Patent
Pathak et al.

(10) Patent No.: US 7,349,890 B1
(45) Date of Patent: Mar. 25, 2008

(54) SYSTEM AND METHOD FOR DYNAMICALLY APPLYING CONTENT MANAGEMENT RULES

(75) Inventors: Heeren Pathak, Woburn, MA (US); Jeffrey M. Collins, Austin, TX (US); Crandall Chow, Austin, TX (US); Philip M. Irey, IV, Spotsylvania, VA (US)

(73) Assignee: Vignette Corporation, Austin, TX (US)

( * ) Notice: Subject to any disclaimer, the term of this patent is extended or adjusted under 35 U.S.C. 154(b) by 364 days.

(21) Appl. No.: 10/723,954

(22) Filed: Nov. 26, 2003

Related U.S. Application Data

(60) Provisional application No. 60/429,625, filed on Nov. 27, 2002.

(51) Int. Cl.
*G06N 7/00* (2006.01)

(52) U.S. Cl. ............... 706/47; 706/45; 706/46; 706/50; 705/1; 705/7; 705/10; 705/64

(58) Field of Classification Search ............ 706/45–48, 706/50, 925, 55, 56, 1–8, 10, 14–18, 20–29, 706/400, 402, 404, 409, 64, 67–79; 705/50, 705/55, 56, 64, 67–79, 1–8, 10, 14–18, 20–29, 705/400, 402, 404, 409; 707/3–4, 103; 709/201–203, 709/217, 219; 715/500, 513, 733, 738, 744–749, 715/760, 789, 961

See application file for complete search history.

(56) References Cited

U.S. PATENT DOCUMENTS

| | | | |
|---|---|---|---|
| 5,991,735 A | 11/1999 | Gerace | |
| 6,044,375 A * | 3/2000 | Shmueli et al. | 707/101 |
| 6,151,584 A * | 11/2000 | Papierniak et al. | 705/10 |
| 6,438,579 B1 * | 8/2002 | Hosken | 709/203 |
| 6,775,658 B1 * | 8/2004 | Zothner | 706/47 |
| 7,139,757 B1 * | 11/2006 | Apollonsky et al. | 707/7 |
| 2001/0037361 A1 * | 11/2001 | Croy | 709/203 |
| 2001/0039563 A1 * | 11/2001 | Tian | 709/202 |
| 2002/0152237 A1 | 10/2002 | Cohen et al. | |
| 2003/0033191 A1 * | 2/2003 | Davies et al. | 705/10 |
| 2003/0063072 A1 * | 4/2003 | Brandenberg et al. | 345/173 |

\* cited by examiner

*Primary Examiner*—David Vincent
*Assistant Examiner*—Omar F Fernández Rivas
(74) *Attorney, Agent, or Firm*—Sprinkle IP Law Group

(57) ABSTRACT

Embodiments of the present invention provide software products and methods of managing content that substantially eliminate or reduce the disadvantages of previously developed content management systems and methods. More particularly, one embodiment of the present invention includes a set of computer instructions stored on a computer readable medium that are executable to associate a rule with a rule condition, determine if the rule is applicable based on the state of the rule condition, receive a user interaction based on a set of content (e.g., web site content) and, if the rule is determined to be applicable, apply the rule to the user interaction. In one embodiment of the present invention, the rule condition can be metadata that is accessible by the computer instructions. The metadata can change dynamically and, consequently, whether or not the rule applies can change dynamically.

25 Claims, 3 Drawing Sheets

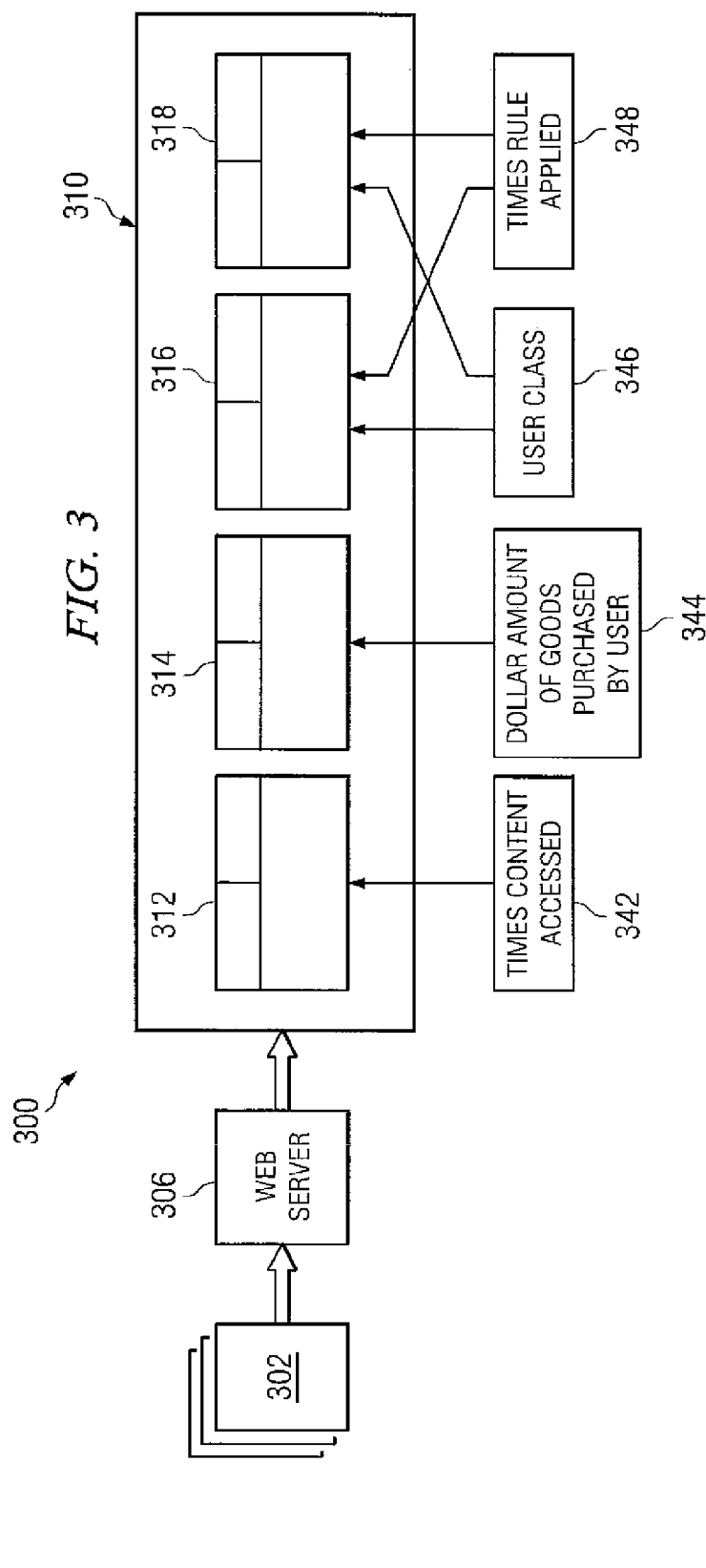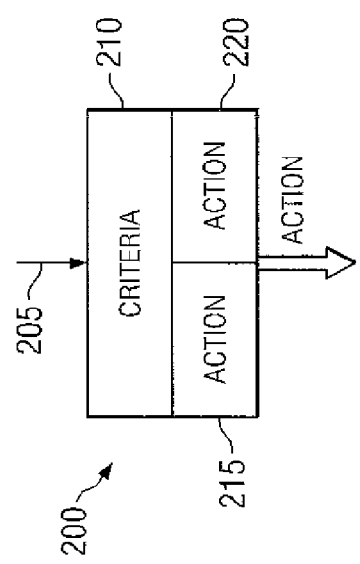

SYSTEM AND METHOD FOR DYNAMICALLY APPLYING CONTENT MANAGEMENT RULES

RELATED APPLICATIONS

This application claims priority under 35 U.S.C. 119(e) to U.S. Provisional Patent No. 60/429,625, entitled "Closed-Loop Feedback System and Method for Content Management," by Pathak et al., filed Nov. 27, 2002, which is hereby fully incorporated by reference herein.

TECHNICAL FIELD

Embodiments of the present invention relate to content management. More particularly, embodiments of the present invention relate to dynamically applying content management rules.

BACKGROUND OF THE INVENTION

Communication of data over computer networks, particularly the Internet, has become an important, if not essential, way for many organizations and individuals to disseminate information. The Internet is a global network connecting millions of computers using a client-server architecture in which any computer connected to the Internet can potentially receive data from and send data to any other computer connected to the Internet. The Internet provides a variety methods in which to communicate data, one of the most ubiquitous of which is the World Wide Web. Other methods for communicating data over the Internet include e-mail, usenet newsgroups, telnet and FTP.

The World Wide Web is a system of Internet servers, typically called "web servers", that support documents formatted according to the hypertext markup language ("HTML"). These documents, known as web pages, are transferred across the Internet according to the Hypertext Transfer Protocol ("HTTP"). Web pages are often organized into web sites that represent a site or location on the world wide web. The web pages within a web site can link to one or more web pages (or files) at the same web site or at other web sites. A user can access web pages using a browser program and can "click on" links in the web pages being viewed to access other web pages. Each time the user clicks on a link, the browser program generates an HTTP request and communicates it to web server hosting the web page. The web server retrieves the requested web page and returns the web page to the browser program. The returned web page can provide a variety of information, often referred to as content, including text, graphics, audio and video content. The content of a web site can inform and entertain visitors, provide a mechanism for carrying out transactions, and guide a user's web browsing experience.

Because web pages can display information and receive information from users, web sites have become popular for enabling commercial transactions. As web sites become more important to commerce, businesses are increasingly interested in tailoring the content of the web site to particular users or business goals. Consequently, efficient "content management" is becoming an important aspect of many web sites.

Content management applications determine which content is displayed on a web page. Some current content management systems use simple rules based approaches. In a rules based approach, a rule defines a set of criteria and one or more actions to be taken based on whether or not the criteria are met. A rule is executed when a particular predefined trigger is received. Triggers can be arbitrarily defined based on interactions of a user with a web site. For example, an HTTP request associated with a particular link on a web page can be defined as a trigger. When a user clicks on the particular link, the user's web browser will send an instance of the HTTP request to the web server. In response to the HTTP request, the content server can apply a rule to evaluate the HTTP request against a set of criteria to determine if the HTTP request meets the criteria. If the trigger meets the criteria, the content server can execute an action specified in the rule.

Current content management systems, however, are not sufficiently robust for real-time management of content and business processes. In current systems, an established rule will be applied whenever a corresponding trigger is received.

A user's interactions with a web site are not analyzed in real time to change whether or not particular rules are applied to a user or how the rules are applied. Moreover, information with respect to business processes, such as inventory management or promotional campaigns is not evaluated in real-time to determine if a rule should apply for a given user interaction. Instead, data analysis is performed on a batch basis to determine, for example, which content was viewed the most, which products were purchased the most and so on. Based on this batch analysis, the rules regarding what content is displayed to the user are reconfigured until the next batch analysis occurs. Thus, the rules governing which content is displayed remain constant between batch analyses, and each rule is applied on receipt of the appropriate trigger.

SUMMARY OF THE INVENTION

Embodiments of the present invention provide systems and methods of managing content that may substantially eliminate or reduce the disadvantages of previously developed content management systems and methods. More particularly, one embodiment of the present invention includes a set of computer instructions stored on a computer readable medium that are executable to associate a rule with a rule condition, determine if the rule is applicable based on the state of the rule condition, receive a user interaction based on a set of content (e.g., web site content) and, if the rule is determined to be applicable, apply the rule to the user interaction. In one embodiment of the present invention, the rule condition can be metadata that is accessible by the computer instructions. The metadata can change dynamically and, consequently, whether or not the rule applies can change dynamically.

Another embodiment of the present invention can include a method including associating a rule with a rule condition, determining if a rule is applicable based on a state of the rule condition, receiving a user interaction based on a first set of content and if the rule is determined to be applicable, applying the rule to the user interaction.

Yet another embodiment of the present invention can include a set of computer instructions stored on a computer readable medium, the computer instructions being executable to associate a rule with a predefined piece of metadata, determine if the rule is applicable to user interaction data based on the value of the piece of metadata, receive a set of user interaction data based on a particular user's interaction with content, and apply the rule to the user interaction data if it is determined that the rule is to be applied. According to one embodiment of the present invention, the metadata can represent a metric for measuring whether or not a particular business goal has been achieved. The computer instructions can be executable to determine if the rule should be applied to the user interaction data based on a comparison between the goal and the metric. Because the value of the metric can dynamically change based on user interactions, whether or not the rule applies can also dynamically change.

Embodiments of the present invention provide an advantage over prior art systems and methods of content management by allowing the rules applied to user interactions to be dynamically changed. This obviates the need to wait for batch data analysis to the set of rules applicable to user interactions.

Embodiments of the present invention provide yet another advantage by allowing content management rules to change in order to drive users towards particular business, entertainment or informational goals.

Embodiments of the present invention provide yet another advantage over prior art content management systems by tying a variety of systems, such as profiling services and backend business systems, to content management rules. Because of this, content can be managed in the context of a larger system and can be sensitive to how the larger system is changing in real-time.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 2 is a diagrammatic representation of a rule, according to one embodiment of the present invention;

FIG. 3 illustrates one embodiment of a system for applying rules based on user interactions, according to one embodiment of the present invention;

DETAILED DESCRIPTION

Preferred embodiments of the present invention are illustrated in the FIGURES, like numerals being used to refer to like and corresponding parts of the various drawings.

Embodiments of the present invention provide software products and methods for content management in which user interactions with a set of content initiate the execution of one or more rules that affect the subsequent content. The rules that affect the content can change based on the user interactions, backend business processes or other conditions. For example, embodiments of the present invention provide a system and method for content management in which the rules applied to generate content are sensitive to the achievement of a predefined goal. When the predefined goal is reached, the rules can automatically change to offer different content. One advantage of certain embodiments of the present invention is the ability to change which rules are applied in real-time based on conditions sensitive to user interactions and various other processes.

According to one embodiment of the present invention, a set of computer instructions can be executable to associate a rule condition with one or more rules. The rule condition can be data or metadata, such as, but not limited to, content metadata (e.g., the number of times a piece of content has been viewed), user metadata (e.g., the class of user), rule metadata (e.g., how many times the rule has been executed), or arbitrarily defined system data or metadata. Depending on the state of the data or metadata, the computer instructions can apply or not apply the associated rule(s). In one embodiment of the present invention, the metadata can be a metric associated with a business goal, such as the number of units sold. The computer instructions can be executable to apply rules to provide content to users to drive the users towards the business goal (e.g., the sale of a certain number of products). The state (i.e., value) of the metric can be updated each time a unit is sold. The computer instructions can be executable to change the rules applied when the business goal has been reached (e.g., when the metric reaches a particular value).

Figure 1:
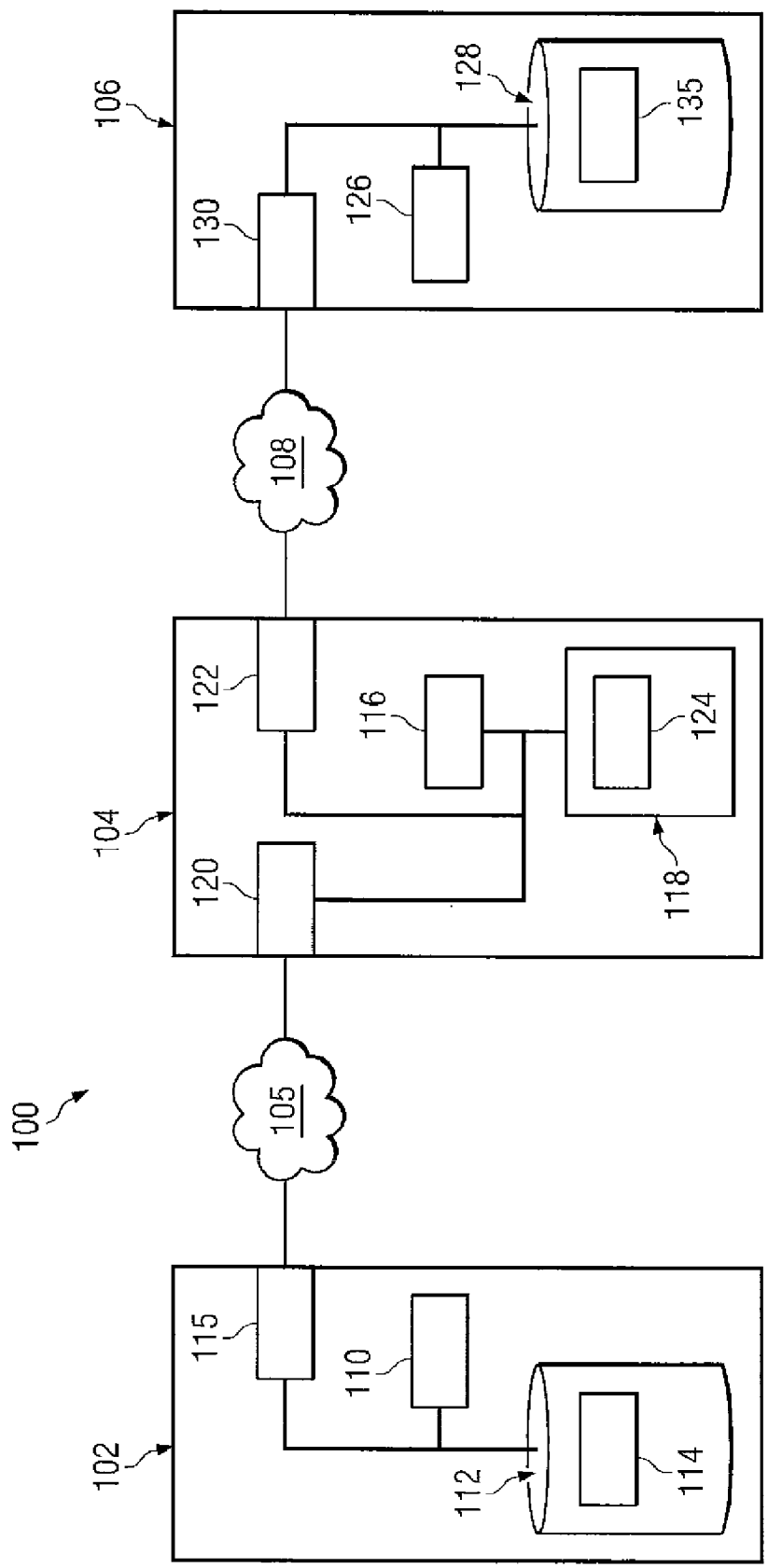
FIG. 1 is a diagrammatic representation of a system 100 for content management according to one embodiment of the present invention.

FIG. 1 is a diagrammatic representation of a system 100 for content management according to one embodiment of the present invention. System 100 can include a client computer 102 connected to a web server 104 via a network 105 (e.g., LAN, WAN, global computer network or other communications network known in the art). Web server 102 can connect to a content server 106 via a second network 108 (e.g., LAN, WAN, global computer network or other communication network known in the art).

Client computer 102 can include a processor 110 coupled to a storage medium 112 (e.g., RAM, ROM, magnetic storage, optical storage and/or other storage media known in the art) and a network interface device 115 (e.g., Ethernet card, fibre channel interface, coaxial interface or other interface known in the art). Storage device 112 can include a web browser 114 for making requests to web servers and receiving content in return.

Web server 104 can include a processor 116 coupled to a storage device 118 (e.g., RAM, ROM, magnetic storage, optical storage and/or other storage media known in the art), network interface device 120 and a network interface device 122. Network interface device 120 and network interface device 122 can comprise any network interface devices known in the art. Storage device 118 can contain a web server program 124 that can access and serve content associated with a web site.

Content server 108 can include a processor 126 coupled to a storage medium 128 (e.g., RAM, ROM, magnetic storage, optical storage and/or other storage media known in the art) and network interface 130 (e.g., Ethernet card, fibre channel interface, coaxial interface or other interface known in the art). Storage medium 128 can store a rules engine 135 that can apply rules to user interactions to dynamically serve content. Additionally, rules engine 135 can dynamically update how rules are applied based on user interactions and/or system state. Rules engine 135 can change the behavior of rules in real time to change content presented to users based on, for example, the achievement of business goals. Because rule behavior can change dynamically, embodiments of the present invention do not require batch data analysis to be performed before rule behavior is updated.

In operation, client computer 102, can display content to a user through browser 114. As would be understood by those Using browser 114, the user can interact with the content by, for example, clicking on hyperlinks in the content, filling in forms or interacting with the content in other manners. Based on a user's interaction, browser 114 can generate an HTTP communication (e.g., an HTTP POST command, an HTTP GET command or other HTTP communication known in the art) and send the HTTP communication to web server 104. The HTTP communication can include a variety of data related to the user's interaction with the content including, for example, the browser type, user provided data, cookies or other data.

Web server 104 can process the HTTP communication from client computer 102. If web server 104 determines that new or additional content should be communicated to browser 114, server program 124 can initiate a script, using, for example, the common gateway interface ("CGI") mechanism, to send data based on the user's interaction to content server 108 to generate the new or additional content. Rules engine 135 can analyze the data provided by server program 124 and apply one or more rules based on the data. The rules can be used to determine which content is provided back to the user based on the user's interaction with the previous content.

According to one embodiment of the present invention, rules engine 135 can examine rule conditions associated with predefined rules to determine if a particular rule or set of rules should apply to the received data. The state of the rule conditions can change dynamically based on the user, business processes, or other factors. Therefore, the rules applied to user interactions can also change dynamically. This is different than prior art systems in which the rules applied to user interaction data do not dynamically change between batch analysis of user interactions. Based on the rules applied, content server 106 can return content to web server 104.

Although shown as a stand alone program in FIG. 1, rules engine 135 can be implemented as part of a larger program, such as content server or a web server program, or according to any suitable programming architecture as would be understood by those of skill in the art. Additionally, rules engine 135 can be distributed across multiple computer readable media and can be executed by multiple processors.

FIG. 2 is a diagrammatic representation of a rule 200, according to one embodiment of the present invention. Rule 200 can include one or more triggers, such as trigger 205, a set of criteria 210 and one or more actions (e.g., action 215 and action 220). Trigger 205 is an identifier that causes a particular rule to be evaluated. A rules engine can receive one or more triggers based on a user's interaction with the content of, for example, a web site. The triggers can be contained in the data received or generated in response to a particular user interaction. The rules engine can evaluate a particular trigger (e.g., trigger 205) against criteria 210 to determine whether the trigger meets the criteria. If the trigger meets criteria 210, action 215 can be executed. Action 215 can be one or more sets of tasks or commands to run. For example, action 215 can dictate that certain content be served, that a notification be sent to an administrator or that other action be taken.

In prior art rules systems, an arbitrary number of rules can be established to govern serving of content. The rule set can be executed to customize content based, for example, on a user's browser type or the domain from which the user came. As web page requests are received or information provided by a user through a web page, each rule in the rule set is evaluated. However, the rules applied do not typically change in real-time. Instead, the rules are typically reconfigured by an administrator on a periodic basis.

Embodiments of the present invention, however, provide a rules engine that can dynamically change which rules are applied to user interactions. According to one embodiment of the present invention, the rules engine can associate a rule with a rule condition. Depending on the state of the condition, the rules engine of the present invention can apply a particular rule or not apply the rule. The state of the condition can change, in real time, based on user interactions or machine interactions (e.g., based on interactions with backend systems). Accordingly, the rules engine can dynamically change the rules that are applied to user interactions with a web site. This can facilitate the implementation of automatic feedback loops for content management that drive users toward a particular business, entertainment, informational or other goal.

FIG. 3 illustrates a system 300 for applying rules based on user interactions, according to one embodiment of the present invention. In system 300, a user can be provided content 302 (e.g., graphics, text, sound, video or other content known in the art) over, for example the Internet. Using a software program, such as a web browser, the user can interact with content 302. Possible interactions with the content can be predefined, such as by defining hyperlinks in content 302, providing forms in content 302 or providing any other interaction mechanism in content 302, as would be understood by those of ordinary skill in the art. When the user interacts with content 302, interaction data 304 representing the interaction can be passed from the user's web browser, or other software application, to, for example, web server program 306, which can, in turn, pass interaction data 304, modified or unmodified, to rules engine 310. It should be noted that an interaction can be arbitrarily defined and can include multiple HTTP communications. Rules engine 310 can apply various rules and/or rule sets (e.g., rule 312, rule 314, rule 316, and rule 318) to the received interaction data. In other words, rules engine 310 can apply rules to the user interactions to manage content or take other actions.

Each rule can be associated with one or more rule conditions for determining whether the rule is applicable. For example, rule 312 can be associated with rule condition 342, rule 314 can be associated with rule condition 344, and rule 316 and rule 318 can be associated with rule condition 346 and rule condition 348. It should also be noted that a group of rules can be associated with a rule condition. A rule condition can be an arbitrarily defined set of data and/or metadata that can govern the application of an associated rule(s). A rule condition can, for example, include metadata maintained by any system from which rules engine 310 is configured to access data, including, but not limited to, metadata about particular users (e.g., how many times a user has visited a web site) maintained by a user profiling service, metadata about content (e.g., when a piece of content was last viewed) maintained by a web server or content management program, metadata about the rule itself (e.g., how many times has rule been applied) maintained by rules engine 310, or any other metadata that can be derived. Based on the state of the data or metadata (e.g., the value or other characteristic of the data or metadata), rules engine 310 can determine the applicability of a particular rule to interaction data 304.

According to one embodiment of the present invention, rules engine 310 can treat a rule condition as an object accessible by the rules engine. The object can contain the data or metadata that rules engine 310 uses to determine the applicability of an associated rule. In this embodiment of the present invention, rules engine 310 can make a call, according to any object-oriented programming language, to access a rule condition to determine the applicability of an associated rule or rule set. For example, rules engine 310 can make a JAVA or XML call to access metadata from an object representing condition 342. Based on the state of the metadata in object 342, rules engine 310 can determine whether or not to apply rule 312 to interaction data 304.

The state of the rule conditions can change dynamically, based on the particular user interacting with content 302. Assume, for example, content 302 is associated with an e-commerce web site advertising electronics products. Rule 312 can specify that if the user clicks on an image of computer in content 302, an alert be sent to an administrator. Condition 342 can include metadata provided by a content server providing a metric of how many times the computer image has been clicked on. Rules engine 310 can be configured such that if the computer image has been clicked on more than 500 or more times, as determined from rule condition 342, rule 312 will apply.

When a particular user interacts with content 302 by, for example, clicking on the computer image, rules engine 310 can call an object representing condition 342 to determine that the computer image has only been clicked on 499 times. In this case, rules engine 310 will not apply rule 312. However, the state of condition 342 can be dynamically updated by, for example, the web server program, to reflect that content 302 has now been clicked on 500 times. When the next user accesses content 302 and clicks on the computer image, rules engine 310 will apply rule 302 based on the new state of condition 342. Consequently, rules engine 310 can execute rule 312 to send an alert to an administrator notifying the administrator that the computer image has been clicked on more than 500 times. This can allow the administrator to reprioritize the computer image (i.e., make it more or less prominent in content 302) for subsequent users. In another embodiment of the present invention, rule 312 can automatically reprioritize the computer image.

As another example, rule 314 can specify that if a user clicks on a particular product in content 302, the user is shown popular products of approximately the same price and a discount is offered on the additional products shown. Rule condition 344 can, for example, include the total dollar amount of goods previously purchased by the particular user from the web site. This information can be maintained by, for example, a profiling service or a backend customer database. Rules engine 310 can be configured such that rules engine 310 can apply rule 314 only if the user has purchased more than a particular dollar amount of goods. When interaction data 304 is received by rules engine 310, rules engine 310 can call an object representing condition 344 to determine the dollar amount of goods purchased by that customer in the past. If the amount of goods purchased in the past is sufficient, rule 314 can be applied to determine if the criteria of rule 314 are met to offer the related products and discount information. Thus, the user will only see the related products and discount information if he or she has purchased a sufficient amount of products in the past.

As yet another example, rule 316 can specify that a user who accesses content 302 should be offered a 15% discount on products shown in content 302 and rule 318 can specify that a user who accesses content 302 should be given a five dollar discount on the same products. Rule condition 346 can specify the number of times a user has visited the web site and can be defined in, for example, a user profile maintained by a profile service. One example of a profile system is described in United States Provisional Patent Application No. 60/434,189, entitled "Profile Service-Profiles on Complex Structures," by Irey et al., filed Dec. 17, 2002, which is hereby fully incorporated by reference herein. Rule condition 348, on the other hand, can specify the number of times rule 316 has been applied, which can be maintained by rules engine 310. In this case, rules engine 310 can be configured to apply rule 316 and rule 318 (e.g., to offer a 15% discount and a $5 discount) to users who have visited the web site less than a certain number of times (e.g., to "new users"). Since each of rule 316 and rule 318 can be applied to new users, rules engine 310 can be further configured to, for example, apply rule 316 to only the first 500 new users and apply rule 318 to each new user after that (i.e., based on rule condition 348). In this example, when a user accesses content 302, rules engine 310 can access a user profile for that user and determine the state of condition 346 to find out if the user is a new user. If the user is a new user, rules engine 310 can access condition 348 to determine if rule 316 has already been applied 500 times. If not, rules engine 310 can execute rule 316 to offer the 15% discount. If, on the other hand, rules 316 has already been executed 500 times, rules engine 310 can execute rule 318 to offer the five dollar discount. As shown in this example, rule conditions can be used to arbitrate between potentially applicable rules.

A rule condition can thus define data or metadata upon which the applicability of an associated rule depends. The data or metadata can include any arbitrarily defined data or metadata, including, but not limited to, user metadata (e.g., as maintained in a user profile), content metadata (e.g., as maintained by a content management system), system metadata and/or rules metadata. The data or metadata can be defined in an object accessible by rules engine 310 according to any object oriented programming call. The state of various rule conditions (i.e., the data or metadata associated with rules) can change dynamically based on a user's interaction with content 302. Consequently, the rules that are applicable can also dynamically change.

It should be noted that the specific examples of rules and rule conditions are provided by way of example, and any arbitrarily complex scheme of rules and rule conditions can be implemented. Rules engine 310 can evaluate the conditions to determine which rules are applicable to a given user interaction and then apply the rules. Because the rule conditions can dynamically change, the rules applied can also dynamically change. Rules engine can evaluate rule conditions on a per interaction basis or can evaluate rule conditions on a periodic basis to determine which rules are applicable to user interactions. Applicable rules are applied to the user interaction data as described in conjunction with FIG. 2, with triggers being evaluated against criteria in the rules to determine if an action in the particular rule should be taken.

Because the rules applied to user interactions can dynamically change, embodiments of the present invention can be implemented to drive users towards predefined business, entertainment or informational goals. For example, according to one embodiment of the present invention, a rule condition can define a business metric, such as number of units of a product sold. Before a certain number of units are sold, rules engine 310 can apply rules that, for example, provide content to users promoting a product (e.g., offering discounts on the product and so on). When a predefined number of units have been sold, rules engine 310 can apply other rules to promote different products, reducing the emphasis on the original product. As another example, a rule condition can be defined as the profit margin realized on the sale of product. Rules engine 310 can apply rules to manage content to offer discounts to particular users to meet the goal for a particular margin. The rules applied can change as the goal profit margin is met or not meet and/or on the degree of difference between actual margin and realized margin. As users interact with the content of the web site, rules engine 310 can tailor, in real-time, the content presented to the user's based on the state of the rule condition (i.e., the profit margin) to drive the realized profit margin towards the goal profit margin.

Thus, embodiments of the present invention can manage content in the context of business processes. In other words, the rules applied to generate content based on user interactions can dynamically change based on whether or not a particular business goal has been met. Moreover, processes that are not traditionally considered part of content management, such as e-commerce processes, user profiling processes, and backend business processes (e.g., inventory management, shipping, etc.) can establish data or metadata that can be used by the rules engine to determine which rules apply and, consequently, which content is distributed to users to facilitate achievement of the business goal.

Figure 4:
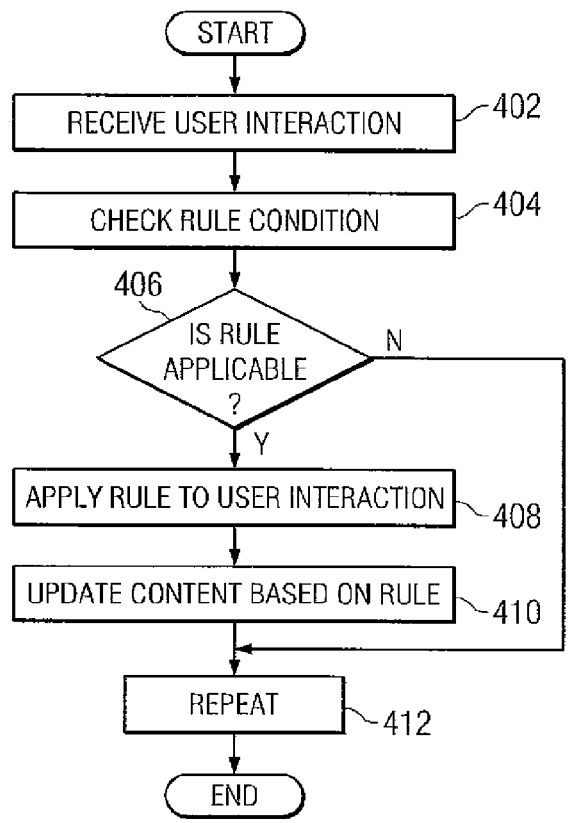
FIG. 4 is a flow diagram illustrating one embodiment of applying a rule to a user interaction according to one embodiment of the present invention.

FIG. 4 is a flow diagram illustrating one embodiment of applying a rule to a user interaction according to one embodiment of the present invention. In one embodiment of the present invention, a set of computer instructions (a "rules engine") stored on a computer readable medium can be executed by a computer processor to carryout steps 402-412. The rules engine, at step 402, can receive a user interaction. The user interaction can be received, for example, as a set of data generated based, for example, on a user interacting with a set of content presented to the user.

At step 404, the rules engine can determine the state of a rule condition to determine if an associated rule should apply to the user interaction. The rule condition can be any arbitrarily defined data or metadata. Based on the state of the data or metadata for the rule condition, the rules engine can determine whether or not to apply a particular rule. In one embodiment of the present invention, the rules engine can check the state of the rule condition by making an object call to an object representing the rule condition and comparing the received data or metadata to a predefined value.

If it is determined that a rule should be applied (step 406), the rules engine can apply the rule (step 408) to update content (step 410). The rule can be applied by, for example, comparing triggers in the user interaction data to criteria defined in the rule to determine what, if any, actions should be executed according to the rule. The rule can be applied to update the content (step 408) communicated to the present user and/or the content communicated to subsequent users. Steps 402 through 410 can optionally be repeated (step 412).

It should be noted that the rule conditions can be based on any data or metadata including, but not limited to user data and metadata, content data and metadata, system data or metadata or other data or metadata. The rule condition can be represented as an object accessible by an object-oriented programming call. Additionally, the rules applied can comprise any arbitrarily defined rule. For example, rules can be executable to affect content seen by a particular user, affect content seen by subsequent users, send notifications to administrators, initiate backend business processes or carry out other processes.

Thus, one embodiment of the present invention can comprise associating a rule condition (e.g., predefined data or metadata) with one or more rules and determining the state of the rule condition (e.g., the value of the data or metadata). If the rule condition has a predefined state, the associated rule(s) can be applied to affect content presented to a particular user or subsequent users. The rule condition can be any arbitrarily defined data or metadata and the state of the rule condition can change dynamically. Thus, whether a particular rule is applied to user interactions can also change dynamically.

Figure 5:
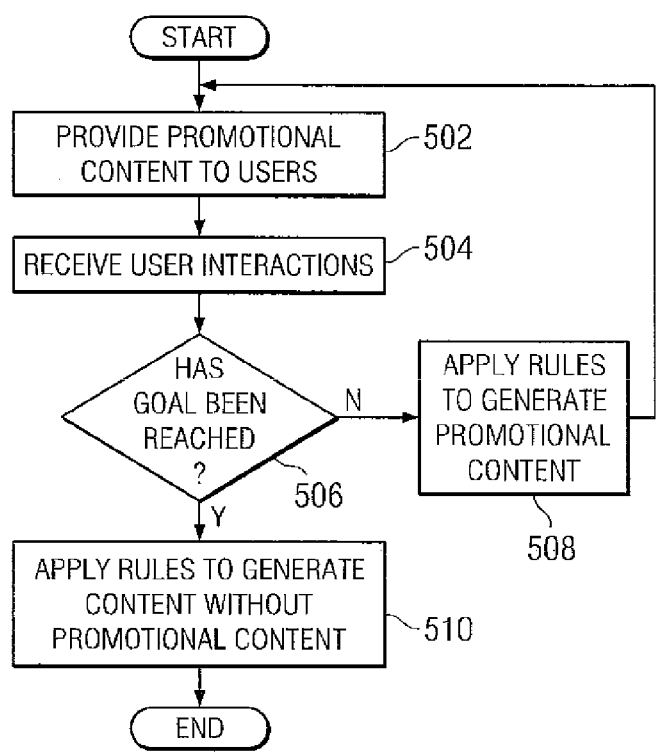
FIG. 5 illustrates one embodiment of dynamically applying rules to achieve a business goal.

FIG. 5 illustrates one embodiment of dynamically applying rules to achieve a business goal. At step 502 a set of promotional content can be displayed to users. The promotional content can, for example, offer discounts on a particular product. A user can interact with the promotional content by, for example, clicking on hyperlinks, ordering products and so on. Data associated with the user interaction can be received by a rules engine at step 504.

At step 506, the rules engine can check one or more metrics associated with a business campaign. As an example, the metric of interest can be the number of units of a products sold. In this case rules related to promoting the product can be associated with a metric providing a value of the number of units of the product sold. The rules engine can determine the number of units of a product sold from the metric by, for example, calling an object that contains the metric. Additionally, the rules engine can compare the metric to a goal to determine if rules for offering promotional content should be applied. Continuing with the previous example, the rules engine can compare the number of units sold of a particular product to a goal number of units. If the goal has been met, the rules engine can apply rules to generate content for users that does not include the promotion (step 508). If, on the other hand, the goal has not been reached, the rules engine can apply other rules to generate content for users that includes the promotion (step 510). In this manner, the content presented to users can be dictated by a feed-back loop sensitive to the achievement of a business goal.

The rule conditions associated with rules can be arbitrarily complex. For example, the rules engine, as the goal is approached, can apply rules to provide promotional content to users with an established session while not providing the promotional content to users establishing new sessions. In this case, the applicability of a rule that serves promotion content is tied both the value of the metric (i.e., the number of units sold) and the session status of the user. As another example, once the goal is reached, the rules can apply to the rule to user to whom the rule has already been applied, but not apply to the rule to other users.

Thus, embodiments of the present invention provide a software product and method for content management in which user interactions with a set of content initiate the execution of one or more rules that affect the subsequent content. The rules that affect the content can be sensitive to the user interactions, business processes, system states or other conditions. For example, embodiments of the present invention provide a system and method for content management in which the rules applied to generate content are sensitive to the achievement of a predefined goal. When the predefined goal is reached or neared, the rules can automatically change to offer different content. One advantage of certain embodiments of the present invention is the ability to change which rules are applied in real-time based on conditions sensitive to user interactions and various other processes.

According to one embodiment of the present invention, a set of computer instructions can be executable to associate a rule condition with one or more rules. The rule condition can be data or metadata, such as, but not limited to, content metadata (e.g., the number of times a piece of content has been viewed), user metadata (e.g., the class of user), rule metadata (e.g., how many times the rule has been executed), or arbitrarily defined system data or metadata. Depending on the state of the data or metadata, the computer instructions can apply or not apply the associated rule(s).

In one embodiment of the present invention, the metadata can be a metric associated with a business goal, such as the number of units sold. The computer instructions can be executable to apply rules to provide content to users to drive the users towards the business goal (e.g., the sale of a certain number of products). The state (i.e., value) of the metric can be updated each time a unit is sold. The computer instructions can be executable to change the rules applied when the business goal has been reached (e.g., when the metric reaches a particular value).

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the scope of this invention as claimed below.

The invention claimed is:

1. A method for robust real-time management of content in a network environment, comprising:
    associating each of a plurality of content management rules with one or more rule conditions for determining an applicability of said each of said plurality of content management rules to said content;
    dynamically updating the state of said one or more rule conditions;
    depending upon the state of said one or more rule conditions, selectively applying one or more applicable content management rules associated therewith to provide said content to users to drive said users towards a first predefined goal; and
    upon reaching said first predefined goal, automatically changing behavior of content management rules applied to said content in real time.

2. The method of claim 1, further comprising dynamically updating the state of said one or more rule conditions based on user interactions, machine interactions, or a combination thereof.

3. The method of claim 1, wherein each content management rule comprises one or more triggers, a set of criteria, and one or more actions.

4. The method of claim 1, wherein at least one rule condition is associated with a group of content management rules.

5. The method of claim 1, wherein each of said one or more rule conditions is associated with data or metadata that governs said applicability of said each of said plurality of content management rules to said content.

6. The method of claim 5, wherein at least one of said one or more rule conditions is an arbitrarily defined set of said data, said metadata, or a combination thereof.

7. The method of claim 5, wherein said metadata is characterized as user metadata, content metadata, rule metadata, or system metadata.

8. The method of claim 1, further comprising representing each of said one or more rule conditions as an object accessible by a rules engine.

9. The method of claim 8, wherein said object contains data or metadata and wherein said rules engine determines, based upon said data or said metadata, said applicability of said each of said plurality of content management rules to said content.

10. The method of claim 1, further comprising automatically reprioritizing a computer image of said content upon reaching said first predefined goal.

11. The method of claim 1, further comprising dynamically changing content management rules applied to said content to drive said users towards a second predefined goal.

12. A computer readable medium carrying computer instructions implementing a software product for robust real-time management of content in a network environment, wherein the computer instructions are executable by a computer processor to:
    associate each of a plurality of content management rules with one or more rule conditions for determining an applicability of said each of said plurality of content management rules to said content;
    dynamically update the state of said one or more rule conditions;
    depending upon the state of said one or more rule conditions, selectively apply one or more applicable content management rules associated therewith to provide said content to users to drive said users towards a first predefined goal; and
    upon reaching said first predefined goal, automatically change behavior of content management rules applied to said content in real time.

13. The computer readable medium of claim 12, further comprising computer instructions for dynamically updating the state of said one or more rule conditions based on user interactions, machine interactions, or a combination thereof.

14. The computer readable medium of claim 12, wherein each content management rule comprises one or more triggers, a set of criteria, and one or more actions.

15. The computer readable medium of claim 12, wherein at least one rule condition is associated with a group of content management rules.

16. The computer readable medium of claim 12, wherein each of said one or more rule conditions is associated with data or metadata that governs said applicability of said each of said plurality of content management rules to said content.

17. The computer readable medium of claim 16, wherein at least one of said one or more rule conditions is an arbitrarily defined set of said data, said metadata, or a combination thereof.

18. The computer readable medium of claim 16, wherein said metadata is characterized as user metadata, content metadata, rule metadata, or system metadata.

19. The computer readable medium of claim 12, further comprising computer instructions for representing each of said one or more rule conditions as an object accessible by a rules engine.

20. The computer readable medium of claim 19, wherein said object contains data or metadata and wherein said rules engine determines, based upon said data or said metadata, said applicability of said each of said plurality of content management rules to said content.

21. The computer readable medium of claim 12, further comprising computer instructions for automatically reprioritizing a computer image of said content upon reaching said first predefined goal.

22. The computer readable medium of claim 12, further comprising computer instructions for dynamically changing content management rules applied to said content to drive said users towards a second predefined goal.

23. A system for robust real-time management of content in a network environment, comprising:

a processor; and a computer readable medium carrying computer instructions executable by said processor to:

associate each of a plurality of content management rules with one or more rule conditions for determining an applicability of said each of said plurality of content management rules to said content;

dynamically update the state of said one or more rule conditions;

depending upon the state of said one or more rule conditions, selectively apply one or more applicable content management rules associated therewith to provide said content to users to drive said users towards a first predefined goal; and upon reaching said first predefined goal, automatically change behavior of content management rules applied to said content in real time.

24. The system of claim 23, wherein said computer readable medium further comprises computer instructions for representing each of said one or more rule conditions as an object accessible by a rules engine, wherein said object contains data or metadata and wherein said rules engine determines, based upon said data or said metadata, said applicability of said each of said plurality of content management rules to said content.

25. The system of claim 23, wherein said computer readable medium further comprises computer instructions for dynamically changing content management rules applied to said content to drive said users towards a second predefined goal.

* * * * *